United States Patent [19]
Chizhov

[11] 3,848,469
[45] Nov. 19, 1974

[54] SAMPLE INTRODUCTION SYSTEM FOR GAS CHROMATOGRAPH

[76] Inventor: Leonid Vladimirovich Chizhov, Leninsky prospekt, 82/2, kv. 362, Moscow, U.S.S.R.

[22] Filed: Apr. 4, 1973

[21] Appl. No.: 347,727

[30] Foreign Application Priority Data
Oct. 11, 1972   U.S.S.R.............................. 1833600

[52] U.S. Cl.......................................... 73/422 GC
[51] Int. Cl. ........................................ G01n 1/22
[58] Field of Search .............................. 73/422 GC

[56] References Cited
UNITED STATES PATENTS
2,991,647   7/1961   Harris............................ 73/422 GC
3,401,565   9/1968   Stoll .............................. 73/422 GC

FOREIGN PATENTS OR APPLICATIONS
954,067   4/1964   Great Britain ...................... 73/422

Primary Examiner—S. Clement Swisher
Attorney, Agent, or Firm—Holman & Stern

[57] ABSTRACT

A system for the introduction of a liquid, a vaporous or a gaseous sample into gas chromatographs comprises a sampler unit and a sample inlet unit. The two units intercommunicate by means of passages provided with sealing bushings in which a metering element moves which is formed as a bent tube with rods. The metering element is filled with a sample at the instant the ports of the tube communicate with the chambers of the sampler unit, and the sample introduction process is effected at the instant the ports of the tube communicate with the chambers of the sample inlet unit. The sample is forced out of the metering element due to the pressure differential between the sample receiving chamber and the over-pressure chamber.

4 Claims, 3 Drawing Figures

SAMPLE INTRODUCTION SYSTEM FOR GAS CHROMATOGRAPH

The present invention relates to inlet systems, and more particularly to inlet systems for introducing liquid and gaseous samples in the form of gas or vapour into a gas chromatograph, gas analyzer, etc.

The present invention may be most effectively employed for dosing small quantities of liquid and gaseous substances for analysis in the chemical, food, pharmaceutical and other industries.

It is known in the art to employ an apparatus for the introduction of liquid and gaseous samples which has a reciprocating slide valve. This device provided with a sample and a carrier gas feed and discharge passages houses an air-operated slide valve. It has three passages, one of which serves as a metering volume and the other two pass the carrier gas and the sample. The slide valve is actuated by a pneumatic actuator.

Another prior art sample introduction device has a liquid-sample piston-design type with a sliding piston. Yet another known device has a rotating unit with two flat disks.

The known sample introduction devices exhibit several drawbacks, the main among them being: (a) the need for precision machining the plane or cylindrical contact surfaces, which consequently has difficulties in its manufacture and service, as well as high cost; and (b) low reliability and frequent failures due to the microscratches on the ground-in surfaces which are caused by suspended solid dust particles or insoluble inclusions penetrating into the device together with the sample.

The known devices incorporating translatory slide valves or pistons, or rotating disks or of the slewing-crane type, are all manufactured as a single unit, which creates difficulties in employing them for the introduction of liquid samples where the sampler comprising submerged sample lines and a metering element must be cooled, and whereas the sample receiving chamber or the vaporizer must be maintained at a high temperature.

Besides, in the piston-type design the tightness deteriorates with the wear of the piston couple (piston and cylinder), with the result being that the sample is metered less accurately and "a memory" (remnants of a sample in the gap between the piston and the cylinder) appears in the system.

There also exists a device for the introduction of liquid samples into a gas chromatography, comprising a heated unit which houses a liquid sample vaporizer which is hermetically sealed from the surrounding medium and communicating at one side with the carrier gas source of the gas chromatograph and at the other side with the separation column of that same gas chromatograph, which vaporizer has a port plugged by a gasket of an elastic material and designed for the introduction of the tip of a needle, wherein an inner capillary passage open on both sides may be filled with the liquid sample fed into the vaporizer (see, for example, Handbuch der Gas-Chromatographie, Leipzig, 1966, Prof. Dr. Ing., Dr. C. E. Leibnitz DDR).

The metering element of said known device is a microsyringe, whereof the needle is formed as a capillary tube with a calibrated channel with a tip on one end. The end of the needle opposite to the tip is connected with the microsyringe body which houses a movable rod coupled with a calibrated wire, the latter entering the needle channel and performing the function of a sliding piston in the suction of a sample into the needle and forcing it into the liquid sample vaporizer.

For the introduction of a liquid sample the microsyringe needle is inserted pointed end foremost through the sealing gasket into the vaporizer, whereupon the sample is forced out of the inner needle channel into the vaporizer by pressing on the rod. The quantity of the sample being introduced into the vaporizer is determined by the displacement of the rod along a metering scale on the microsyringe body.

The service life of the moving and the frictional parts required by the microsyringe design is naturally limited, while the clearance between the calibrated wire and the inner channel of the needle impairs the tightness of the construction.

In the absence of complete tightness the accuracy of introduction and reproducibility of the liquid sample are impaired, particularly when the sample is introduced into a liquid sample vaporizer operated at elevated pressure.

Furthermore, the absence of complete tightness in the known design does not permit the inner channel of the needle to be filled with a liquid sample without allowing air to penetrate thereinto.

What with its moving and frictional parts, the microsyringe cannot be employed for the introduction of liquid samples containing hard insoluble inclusions; nor can it be used for the introduction of corrosive liquids which attack the parts of the microsyringe.

Another disadvantage of said known device, and which detracts also from the introduction accuracy and sample repeatability, is the dead volume which is formed in the clearance between the calibrated wire and the inner channel of the microsyringe needle and which increases with the wear of the frictional parts. As the needle is inserted into the vaporizer part of the sample being analyzed is vaporized with, the quantity of the vaporized sample being difficult to estimate as it depends on such variable parameters such as the size of the clearance between the calibrated wire and the inner channel of the needle, the composition of the mixture being analyzed, the temperature in the vaporizer, the rate of flow of the carrier gas, and the dwell time of the needle in the vaporizer.

The above-listed disadvantages of the known device for the introduction of liquid samples into chromatographs impose limitations on the field of its application and shorten its useful life; they also detract from the introduction accuracy and reproducibility, with the error being worse than several per cent or even several score per cent.

The error increases with the decrease in the quantity of the sample to be introduced.

Another known device for the introduction of liquid samples into a gas chromatograph comprises a sample inlet unit housing a sample receiving chamber (vaporizer) hermetically sealed from the surrounding medium and communicating with the source of the carrier gas and the separation column. It also comprises an overpressure chamber communicating with the source of carrier gas supply and with the surrounding medium via a pressure capillary channel.

Both chambers are plugged with gaskets made of an elastic material.

This known device is equipped with means for providing a pressure differential between the sample receiving chamber and the overpressure chamber which may be formed, for example, as a differential pressure controller. Besides, the device comprises a metering element formed as a bent tube (needle) open on both ends. The ends of the tube are parallel to each other and point in the same direction.

In this device the inner capillary channel of the metering element is filled with a liquid wetting the tube surface by the capillary forces, and with a non-wetting liquid on the positive principle.

The introduction of a sample into a chromatograph is effected by piercing the elastic gasket with both ends of the metering element and inserting one of the needle ends into the sample receiving chamber while the other is inserted into the overpressure chamber. The sample is forced out of the inner capillary channel of the metering element and into the sample receiving chamber due to the pressure differential obtaining between the sample receiving chamber and the overpressure chamber.

The liquid sample is vaporized in the sample receiving chamber and transferred by the carrier gas to the chromatographic column in the form of a vapour.

The above-described device has a serious disadvantage which consists in that its metering element has open ends which communicate with the surrounding medium in the course of sampling and the sample transfer to the inlet chamber.

This feature may result in a partial loss of the sample from the calibrated volume of the metering element into the surrounding medium through sample evaporation, which disadvantage is particularly manifest when dealing with highly volatile liquid samples.

Thus, the foregoing known device, if employed, has a negative effect on the accuracy of the introduction of highly volatile substances and is altogether inapplicable so far as gaseous substances are concerned.

Another disadvantage of said device consists in that the sealing gasket is subject to rapid wear due to its being pierced by the ends of the metering needle. This feature likewise adversely affects the sample introduction accuracy as well as the tightness of the sample receiving and overpressure chambers.

A further disadvantage of the above-described known device which becomes evident when dealing with large quantities of a liquid sample is the ejection of part of the vaporized sample from the hot zone of the sample receiving chamber into the carrier gas line.

The listed disadvantages of the known device for the introduction of a liquid sample into a gas chromatograph impose serious limitations on the field of application and the useful life of the device which may prove prohibitive for its being employed for the introduction of liquid and gaseous samples into industrial automatic and preparative chromatographs.

It is therefore an object of the present invention to provide a sample introduction system for gas chromatographs such as would ensure a high degree of accuracy and reproducibility for the introduction of liquid and gaseous samples.

It is another object of the present invention to provide a sample introduction system for gas chromatographs such as would obviate the need for precision machined friction and moving parts, thus having the consequent economies in their manufacture and an improved tightness over a long period of operation of the system.

It is yet another object of the present invention to provide a sample introduction system for gas chromatographs such that would be highly reliable in operation.

It is a further object of the present invention to provide a sample introduction system for gas chromatographs having a design such as would permit the sampler and sample inlet units to be operated at a substantial temperature differential therebetween, and which would enable the system to be usable with liquid and vaporous samples.

It is herein contemplated that there shall be provided a sample introduction system for gas chromatographs, wherein a moving metering element will transfer a liquid, vaporous or gaseous sample from a sampler unit into a sample inlet unit, and with the sample being prevented from communicating with the surrounding medium.

Accordingly, there is provided a sample introduction system for gas chromatographs comprising a sample inlet unit housing a sample receiving chamber hermetically sealed from the surrounding medium and communicating with a carrier gas source and a chromatographic column, and also housing an overpressure chamber communicating with the source of carrier gas and with the atmosphere, a means for providing a pressure differential between said chambers, and a sampler unit having a metering element formed as a bent tube, whereof the ends are parallel, point in the same direction and have exit ports, wherein, in accordance with the invention, the sample unit comprises a flow-type filling chamber to communicate with the sample via two connecting pipes and hermetically sealed from the surrounding medium and also an exhaust chamber vented via a connecting pipe, and the filling chamber communicating with the sample receiving chamber and the exhaust chamber communicating with the overpressure chamber through passages having sealing bushings which serve as guides for a tube with rods coupled with the ends of the latter tube, said tube being slidably mounted in the sealing guides and movable in two fixed positions so that in one fixed position of the tube with rods the exit ports of the tube communicate with the chambers of the sampler unit, the chambers of the sample inlet unit being sealed from the chambers of the sampler unit by the outer surfaces of the rods, whereas in the other fixed position the exit ports of the tube communicate with the chambers of the sample inlet unit, the chambers of the sample inlet unit being sealed from the chambers of the sampler unit by the outer surface of the tube.

Such a design of a sample introduction system for gas chromatographs dispenses with the precision machined contact moving parts, and the resultant benefits of the simplification of manufacture and the operation procedures as well as the cost is evident.

With the piston couple of the sample introduction system for gas chromatographs of this invention being formed as a metering element, a tube with rods moving in sealing bush-guides, the system operates with a high degree of reliability, since even if a sample contains suspended hard particles, the friction parts of the piston couple are secure against score, insofar as one element of the piston couple is made of metal (the metering element with the rods), while the other is made of an elastic material (the sealing is made of polytetrafluoroethylene).

The proposed sample introduction system for gas chromatographs designed in the form of two separate units coupled one with the other by way of sealing bushes having a low heat conductivity provides for the operation of the sampler the sample inlet units at materially different temperatures therebetween, which is the reason why the proposed system is applicable to both gaseous and liquid samples.

According to another embodiment of the invention, the rods are formed as solid pieces abutted with the end surfaces thereof against the ends of the tube in tight relation thereto, the outer diameter of the tube being equal to the diameter of the rods, and the exit ports of the tube are formed in the lateral surface thereof at the point of connection of the rods with the ends of the tube.

With the inner cavity of the tube of the metering element being vented through the ports formed in the lateral surface of the tube at the point of tight connection of the solid rods with the tube ends, no non-purgeable cavities or clearances can be formed in the metering element, thereby eliminating the possibility of a "memory" arising in the metering element.

In accordance with one of the possible embodiments of this invention, the sealing bushes may be urged by an elastic element in the direction of the motion of the metering element.

An elastic cleat provides for the self-sealing feature of the sealing bushes and guarantees that the system will remain tight at any temperature conditions of operation of the system.

The property of the polyfluoroethylene resins of which the sealing bushes are made to work in contact with metal, requiring no lubrication, provides for a long and useful life for the sample introduction system (measured as the number of sample introduction runs).

It is preferred that there should be provided a check valve at the point of entrance of the carrier gas to the sample receiving chamber formed as a passage, whereinto the rod of the metering element will enter at the instant of sample introduction, the diameter of said passage being equal to that of the rod.

Since the sample receiving chamber is disconnected from the carrier gas line at the instant of sample introduction by the rod of the metering element entering the passage, the sample cannot be ejected from the sample receiving chamber into the carrier gas line, thereby ensuring a true slug injection of the sample into the chromatographic column and minimizing the extent of dilution of the sample with the carrier gas.

An embodiment of the present invention will now be described in detail.

An embodiment of the present invention will now be described, by way of example, with reference to the accompanying drawings, wherein.

Figure 1:
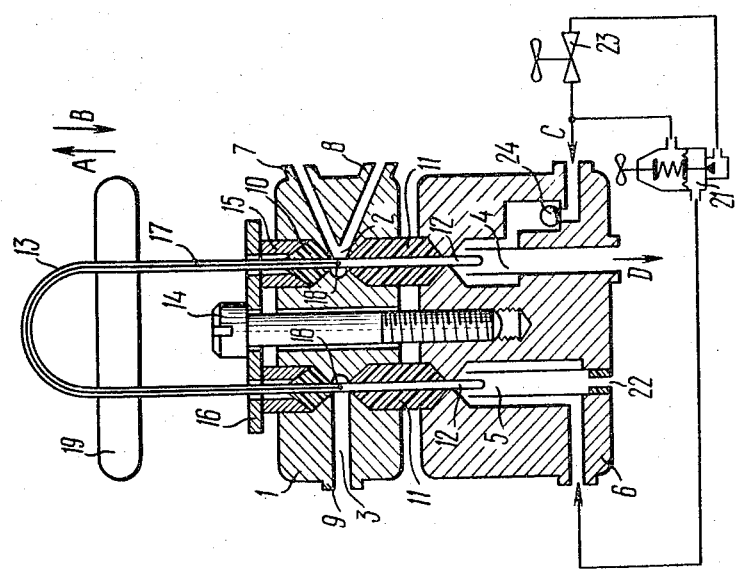
FIG. 1 is a longitudinal section of a sample introduction system according to the invention.

The sample introduction system of this invention comprises a sampler unit 1 (FIG. 1) which is water-cooled when introducing a liquid sample, and heated by a electric heater (not shown) when introducing a vaporous sample.

The sampler unit 1 houses a cylindrical filling chamber 2 and an exhaust chamber 3, whereof the axes coincide with the axes of a sample receiving chamber 4 and an overpressure chamber 5 respectively, and two latter chambers disposed in a sample inlet unit 6.

The filling chamber 2 is fitted with two connecting pipes 7 and 8 communicating with the line carrying the flow of the gas, vapour or liquid to be analyzed.

The chamber 3 communicates with the surrounding medium via a connecting pipe 9.

The chambers 2 and 3 are sealed at one end thereof with sealing bushings 10 and at the other end with sealing bushings 11, the latter simultaneously serving to seal the sample receiving chamber 4 and the overpressure chamber 5. Within the sealing bushings 10 and 11, there is a sample introduction system for this invention are made of polytetrafluoroethylene, having ends 12 of a movable metering element 13 disposed therein.

The sealing bushings 10 and 11 are fixed by a common elastic cleat 16 with a screw 14 through neck bushes 15.

Figure 3:
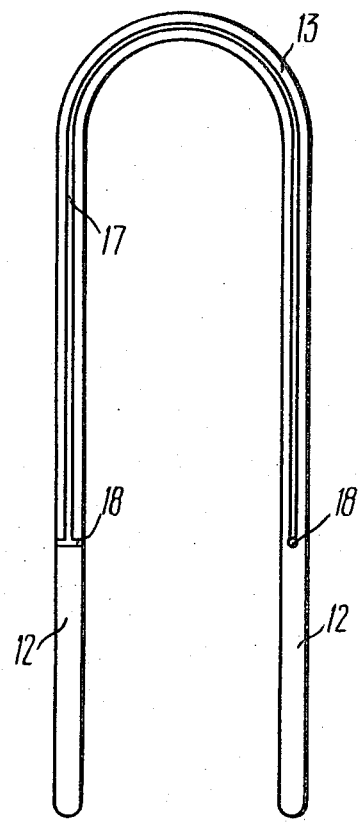
FIG. 3 is a longitudinal section of a metering element of the sample introduction system shown in FIG. 1.

The set of replaceable metering elements 13 (FIG. 3) for different volumetric capacities is made up of stainless-steel tubes differing one from another by its length and an inner diameter of a channel 17. There are ports 18 provided on the lateral surface of both ends 12 of the tube, wherethrough the inner channel 17 is vented. The ends 12 of the tube have extensious in the form of rods, whereof the diameter is equal to the outer diameter of the tube of the metering element 13. At the side of the bend (FIG. 1) the metering element 13 is mechanically connected to a drive 19 which may mechanically reciprocate in the directions indicated by the arrows A and B so that in one extreme the fixed position of the metering element 13 (FIG. 1) and the ports 18 communicate with the filling and exhaust chambers 2 and 3, while in the other extreme the fixed position of the metering element 13 the ports 18 communicate respectively with the sample receiving the chamber 4 and the overpressure chamber 5.

In order to disconnect the sample receiving chamber 4 from the carrier gas line, there is provided a check valve formed as a passage 20 defined in the sample receiving chamber 4 at the carrier gas entrance side as indicated by the arrow C, with the rod 12 of the metering element 13 entering the passage 20. In order to establish a pressure differential between the chambers 4 and 5 there is provided a differential pressure controller 21, while to set the desired rate of the carrier gas flow through the chromatographic column a delicate adjustment valve 23 is provided (alternatively a flow or pressure regulator may be used to this end).

Figure 2:
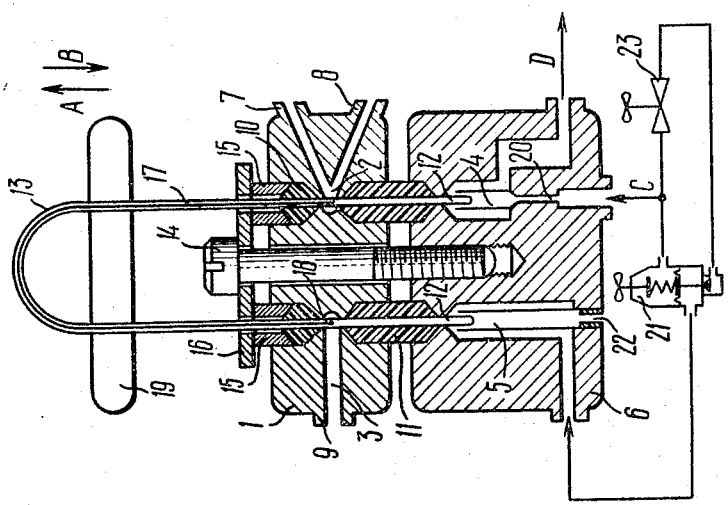
FIG. 2 is a longitudinal section of the sample introduction system shown in FIG. 1, in which the check valve has an alternative design.

FIG. 2 shows a sample introduction system incorporating another design for the check valve. The check valve of this design is provided with a shut-off element formed as a ball 24 mounted in a seat at the point of entrance of the carrier gas to the sample receiving chamber 4 as indicated by the arrow C.

The proposed system for sample introduction from a stream and into a gas chromatograph operates in the following manner.

Depending upon the purposes of the analysis, the type of separation column and the sensitivity of the chromatograph detector, a metering element having the required volumetric capacity is selected from the set of replaceable metering elements 13. Both ends 12 of the metering element 13 are inserted (FIGS. 1 and 2) through the orifices in the elastic cleat 16 of the neck bushing 15 into the sealing bushings 10 and 11, and at the side of its bend the metering element 13 is mechanically connected to the drive 19 of the reciprocating mechanism. The sample receiving chamber 4 is connected to a source of carrier gas supply via the passage 20 at the side C, and to a chromatographic column (not shown) at the side D. The overpressure chamber 5 is coupled to the source of the carrier gas supply via the differential pressure controller 21, and the chamber 5 being vented to the atmosphere via a pressure capillary or throttle 22. The reference volume of the differential pressure controller 21 is coupled to the carrier gas entrance passage in the sample receiving chamber 4.

By using the delicate adjustment valve (or a pressure regulator or a flow regulator) 23 the required flow rate of the carrier gas is set in the chromatographic column, and a pressure differential equal to 0.1 to 0.5 kg/cm$^2$ is established between the sample receiving chamber 4 and the overpressure chamber 5 by means of the differential pressure controller 21.

In order to vaporize a liquid sample in the sample receiving chamber 4 and also when introducing a vaporous sample, the sample inlet unit 6 is heated by an electric heater (not shown).

The filling chamber 2 is connected via the connecting pipes 7 and 8 to the line carrying the medium to be analyzed in such a way that the pressure of a liquid, vapour or gas flowing through the filling chamber 2 should not exceed that in the overpressure chamber 5. The inner longitudinal channel 17 is filled with a sample when the drive 19 of the reciprocating mechanism is in one of its extreme positions, wherein the ports 18 of the metering element 13 communicate with the filling chamber 2 and the exhaust chamber 3.

In order to prevent condensation of the vaporous sample, the sampler unit 1 and the metering element 13 are heated, while in order to prevent gas liberation from a liquid sample containing the low-boiling components, the sampler unit 1 and the metering element 13 are cooled.

Gas samples are sampled and introduced, with the units 1 and 6 being kept at ambient temperature.

At the aforementioned temperature conditions of the sampler unit 1, a sample in the form of a gas, vapour or liquid will flow through the inner longitudinal channel 17 of the metering element 13 and into the exhaust chamber 3, the quantitative and qualitative composition of which sample will be identical with that of the medium to be analyzed.

In order to prevent any pressure variations in the line carrying the medium to be analyzed from affecting the accuracy of filling the metering element 13 with a gaseous sample, the filling chamber 2 is connected to the line carrying the medium to be analyzed via a pressure regulator (not shown).

The self-sealing action of the sealing bushings 10 and 11 at various temperature conditions of the sampler unit 1 and the sample inlet unit 6 is achieved by fixing said sealing bushings by the common elastic cleat 16 with the screw 14 through the neck bushes 15.

In order to effect the sample introduction into the gas chromatograph, the metering element is moved by means of the drive 19 of the reciprocating mechanism from one extreme position to the other (not shown) in which the ports 18 communicate with the chambers 4 and 5. In such a metering element, position the higher pressure obtained in the overpressure chamber 5 urges the carrier gas to instantaneously force the sample out of the inner longitudinal channel 17 and into the sample receiving chamber 4.

The carrier gas then carries the sample to the chromatographic column as indicated by the arrow D.

At the instant of sample introduction, the rod 12 of the metering element 13 enters the passage 20, thereby disconnecting the sample receiving chamber 4 from the carrier gas line, which prevents the sample from being ejected from the sample receiving chamber 4 back into the carrier gas line in the sample introduction system thus incorporating the check valve of the design shown in FIG. 1. With the check valve of the alternative design as shown in FIG. 2, the disconnecting action is effected by the ball 24 being pressed against its seat by the rising pressure in the sample receiving chamber 4 at the instant of sample introduction.

Numerous modifications of the sample introduction system of this invention will occur to those skilled in the art in the light of the foregoing examples which were given just to illustrate the invention, and it is to be understood that the invention is not limited thereto.

The proposed system for the introduction of a sample from a flow system into a gas chromatograph provides for a high accuracy of introduction and reproducibility of liquid and gaseous samples introduced into the chromatographic column of a gas chromatograph.

The design of the system in the form of two separate units, one of which may be cooled while the other heated, makes the system suitable for use with liquid and vaporous samples.

The sealing bushings employed in order to seal off the metering element and the filling, exhaust, sample receiving and overpressure chambers, provide for the tightness of the proposed system over a lengthy period of use.

The check valve incorporated in the proposed system are formed as a passage, whereinto the rod of the metering element enters, prevents the sample from being ejected from the hot zone of the sample receiving chamber and back into the carrier gas line and thus provides for a slug injection of the sample into the chromatographic column.

A contaminated metering element may be quickly and easily replaced by a new one from the stock of spare elements.

The proposed design of sample introduction system may be employed for the automatic introduction of liquid, vaporous and gaseous samples into automatic gas and preparative chromatographs.

The system of this invention may be employed in all other cases where it is required to introduce precisely metered liquid or gaseous samples from a stream or from a closed volume into a stream of carrier gas or liquid.

What we claim is:

1. A sample introduction system for gas chromatographs, comprising: a sampler unit having a flow-type filling chamber hermetically sealed from the atmosphere and an exhaust chamber; two connecting passageways communicating said filling chamber with said sample; a passageway connecting said exhaust chamber, for venting to the atmosphere; a sample inlet unit having a sample receiving chamber sealed from the atmosphere and communicating with a source of carrier gas and a chromatographic column, an overpressure chamber communicating with said carrier gas source and vented to the atmosphere; means for providing a pressure differential between said sample receiving chamber and said overpressure chamber; passages provided with sealing bushings, between said filling chamber and said sample receiving chamber and between said exhaust chamber and said overpressure chamber; a metering element formed as a bent tube with parallel ends pointing in the same direction; exit ports formed in said tube ends; rods connected with said ends of said tube beyond said exit ports, said tube and rods being slidably mounted in said sealing bushings and being capable of reciprocating between two fixed positions so that in one said fixed position of said tube with rods and said exit ports of said tube communicate with the said chambers of said sampler unit, with said chambers of said sample inlet unit being sealed from said chambers of said sampler unit by the outer surfaces of said rods, whereas in the other fixed position said exit ports of said tube communicate with said chambers of said sample inlet unit, with said chambers of said sample inlet unit being sealed from said chambers of said sampler unit by the outer surface of said tube.

2. A sample introduction system as claimed in claim 1, wherein said rods are solid and connected to the end surfaces of said tube in tight relation thereto, the outer diameter of said tube being equal to the diameter of said rods, and said exit ports of the tube are formed in the lateral surface thereof at the point of connection of said rods with the ends of said tube.

3. A sample introduction system as claimed in claim 1, wherein said sealing bushings are elastically urged in the direction of the motion of said metering element.

4. A sample introduction system as claimed in claim 1, incorporating a check valve provided at the gas carrier entrance passage in said sample receiving chamber, the check valve being formed as a passage, whereinto said rod of said metering element enters at the instant of sample introduction, the diameter of said passage being equal to that of said rod.

* * * * *